United States Patent
Webb

[11] Patent Number: 5,986,810
[45] Date of Patent: Nov. 16, 1999

[54] IMAGING SYSTEM

[75] Inventor: Duncan James Webb, Essex, United Kingdom

[73] Assignee: GEC-Marconi Limited, United Kingdom

[21] Appl. No.: 09/120,368

[22] Filed: Jul. 22, 1998

[30] Foreign Application Priority Data

Aug. 2, 1997 [GB] United Kingdom .................. 9716410

[51] Int. Cl.[6] ........................... G02B 27/10; G02B 27/64
[52] U.S. Cl. ....................... 359/618; 359/554; 250/208.1
[58] Field of Search ........................... 359/618, 554–557; 250/208.1, 216; 348/195, 203, 207, 208; 396/20, 21

[56] References Cited

U.S. PATENT DOCUMENTS

| 5,229,609 | 7/1993 | Delteil et al. ........................... 250/332 |
| 5,294,991 | 3/1994 | Oshima et al. .......................... 359/554 |
| 5,309,230 | 5/1994 | Blondel et al. .......................... 348/164 |

FOREIGN PATENT DOCUMENTS

| 0 398 801 A1 | 11/1990 | European Pat. Off. . |
| 0 452 188 | 10/1991 | European Pat. Off. . |
| 0 537 048 A1 | 4/1993 | European Pat. Off. . |
| 2 709 631 A1 | 3/1995 | France . |
| 2 305 573 | 4/1997 | United Kingdom . |

*Primary Examiner*—Huy Mai
*Attorney, Agent, or Firm*—Venable; Robert J. Frank; Robert Kinberg

[57] ABSTRACT

An imaging system is provided which comprises an objective lens arrangement, a linear array of detector elements within a detector the array comprising a row of time delay an integrate (TDI) channels and a scanning optic arranged to scan an image over the array detector elements, the system further comprises means for rotating the scanning optic about an axis (N) normal to an optical surface of the scan optic when the scan optic is in the center of its field of view position, the scan optic being rotated about this axis (N) in dependence on the rate at which the imaging system is panned across a scene, such that a received image is vector scanned across the linear array of detector elements to compensate for loss in image resolution due to the panning action of the imaging system occurring during the period in which an image frame is detected.

15 Claims, 4 Drawing Sheets

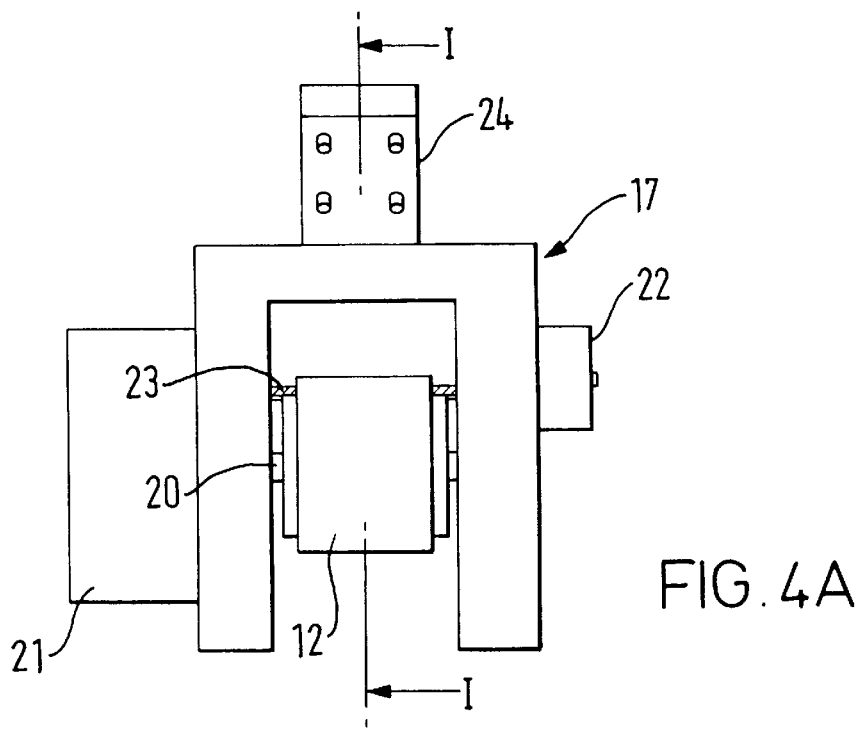
FIG. 4A
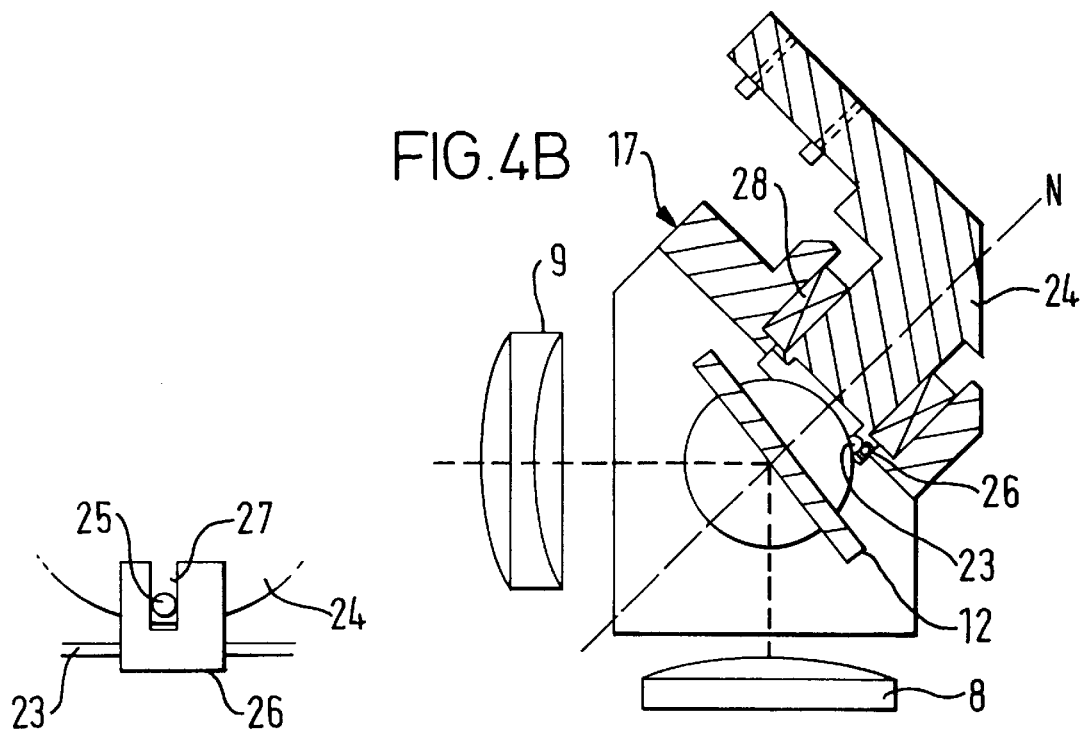
FIG. 4B
FIG. 4C

IMAGING SYSTEM

BACKGROUND OF THE INVENTION

The present invention relates to an imaging system which is to be panned across a viewed scene, and more particularly, but not exclusively to such a system for mounting onboard an aircraft. In the context of this application imaging system is used to define a system which generates data relating to a received image, but the term does not necessarily require that the data be subsequently presented as an image to an operator.

In certain applications it is particularly desirable to use a long linear array of detector elements and to scan an image orthogonally across that array of detector elements such that a complete image frame can be derived from the output of the array of detector elements. Such systems typically find application in high quality infra-red imaging systems. The linear array will often comprise more than a single row of elements and may typically comprise 10 rows of element, permitting time delay and integration (TDI) to be employed.

A common display format will comprise 768 vertical columns of 576 lines each. It has previously been proposed to have 480 element linear detectors, or pseudo linear detectors (see below), arranged vertically relative to an image, with the image being scanned horizontally across the 480 elements. The reasons for such proposals arises because employing 480 element linear detectors, which are commonly available, enables 480 out of a possible 576 lines of an image to be generated. The array is read out 768 times corresponding to the 768 columns of the display. In many applications a 480 row image is acceptable.

It has now been realised that it is advantageous in certain applications to employ long linear arrays of detector elements comprising approximately 768 elements for, although such long linear arrays are usually more expensive, when the image is scanned vertically over such a linear array arranged horizontally, then the array only need be read out 576 times to obtain a full image frame. The significance of this is that for a given standard frame rate the stare time available for each element is increased by approximately one third. Furthermore because the scan is vertical scan interlaces can be performed. This enables a considerable increase in the performance of an infra-red (IR) imaging systems where stare time limits performance. Similar performance improvements can be made with other display formats, for example, 640 vertical columns, of 480 lines.

An imaging system employing a horizontal long linear array of detector elements also has a lower inherent latency arising from the imaging system operating with the same raster scan format as a standard display, or video storage means. Image data from the first complete line of the display is available to the display, video storage means, or image processing means, whilst the remainder of the image is still being generated. This is to be contrasted with systems where the image is generated by scanning across a vertical array of detector elements where no row of the image is complete until the data from the last column of the image has been obtained. This is particularly important in certain applications, such as where the imaging system is mounted on an aircraft and can experience rapid changes in attitude.

A further advantage of using a horizontal array of detector elements is that it reduces the required scan angle. This is advantageous because the performance of such scanning mechanisms normally decreases as the scan angle increases.

Despite the advantages offered by using a horizontal long linear array of detector elements, and scanning an image orthogonally over that array, there is an inherent problem if it is desired to pan the imaging system in a direction having a component perpendicular to the scan direction, because panning causes the image to drift sideways across the detector during composition of an image frame.

In conventional systems, (where the direction of pan is the same as the scan direction), pan rate can be compensated for by either altering the read out time or the horizontal scan rate, if the linear array of detector elements employs a time delay and integration (TDI) technique, where charge generated by a space coordinate of the image is clocked along successive detector elements in a TDI channel of the array of detector elements in synchronisation with the image passing along that channel, such that charge generated by a point on the image is summed with charge generated by the same space coordinate being incident previously on earlier elements of the channel, then controlling the scan rate or clock rate in dependance on pan rate will ensure that synchronisation is maintained between a point on the image moving across the array and the corresponding packet of charge generated moving along the detector elements of a channel. This is not possible where the image moves sideways across the detectors comprised in a TDI channel.

The above poses a particular problem in such applications as search and track, where an infra-red imager is panned across the scene ahead of an aircraft normally to identify objects in an otherwise substantially homogenous environment such as the sea. In such an application TDI processing is particularly important to provide maximum sensitivity whilst maintaining resolution but it is also desired to maximise stare time by employing a long linear array of detectors and scanning vertically across the array to provide a normal image format.

OBJECT OF THE INVENTION

It is the object of the present invention to provide an improved imaging system which addresses the above described problems with present systems.

SUMMARY OF THE INVENTION

According to the present invention there is provided of an imaging system arranged to be panned across a scene, the system comprising: an array of detector elements consisting of a row, extending in a first direction, of channels, each channel comprising a number of detector elements extending in a second direction perpendicular to the first direction; a scan optic arranged to scan an image of the viewed scene across the array of detector elements; and scan optic control means arranged to vary the direction of the scan performed by the scan optic in dependance on the velocity at which the imaging system is panned across a scene, such that a point of the image is scanned on the array in nominally the same direction irrespective of pan velocity, which direction corresponds to the second direction.

By employing the present invention and controlling the direction of scan of the scan optic in dependance on the pan velocity, sideways drift of the image relative to the detector element can be compensated for. This is particularly important when each channel is a TDI channel where sideways drift of the image in excess of the dimension of a detector element would greatly reduce resolution and thus sensitivity.

Preferably the scan optic scans an image across the detector array nominally in the second direction by rotation about a scan axis, and the scan optic control means comprises means arranged to rotate, in dependance on the pan velocity, the scan axis of the scan optic about a vector scan axis, normal to the plane of an optical surface of the scan optic when the scan optic is substantially in a centre of field of view position, such that movement of the image due to pan rate is substantially compensated for by rotation of the scan axis about the vector scan axis. This provides relatively simple mechanism for compensating for the effect of pan velocity on the image received on the linear array of detector elements, even if the pan velocity is constantly varying, as in a search and track application where an imager is panned to and fro in front of the aircraft to which it is mounted, a negative rotation about the vector scan axis compensating for a negative pan velocity. By rotating the scan optic very little inertia is encountered.

Alternatively where the scan optic is mounted on piezo-electric elements these elements can be controlled by the scan optic control means to vary the scan performed by the scan optic in dependence on the velocity which the imaging system is panned across a scene.

Employing the present invention will cause geometric distortion of the image due to the change in the scan angle. However geometric distortion can be corrected by straight-forward image processing techniques. A correction can be applied in dependance on the vector scan angle which correction may be determined by using a look-up table. However in some applications such as search and track, in the search (panning) mode it is not always necessary to generate an image for visual inspection, it only being necessary for the system to electronically detect an object which can then be looked at by the imager in a stationary "track" mode.

Advantageously the scan velocity in the second direction is maintained substantially constant irrespective of pan velocity, which is equivalent to maintaining the scan ampli-tude constant in the second direction. This requires the scan amplitude to be adjusted to compensate for the scan being vectored in dependance on pan velocity.

Preferably the system is arranged for mounting on an aircraft, the system further comprising means for determin-ing the rate at which the image is panned across the field of view of the imaging system from data relating to the velocity and attitude of the aircraft, the azimuth pan rate of the imaging system and the range and/or altitude and pointing elevation of the boresight of the imaging system. This information is normally available from control systems aboard the aircraft.

The system is particularly applicable to infra-red imaging systems employing a long linear array of cooled detector elements.

One embodiment of the present invention will now be described by way of example only with reference to the accompanying drawings, in which like numerals are used throughout to indicate like parts, and of which:

BRIEF DESCRIPTION OF THE DRAWINGS

FIG. 4A is a front elevation of the scanning optic and scanning optic control means in accordance with the present invention;

FIG. 4B is a cross section along the line I—I FIG. 3A;

FIG. 4C is an expanded view of the mechanical linkage of the apparatus illustrated in FIG. 4B;

DETAILED DESCRIPTION OF A PREFERRED EMBODIMENT OF THE INVENTION

Figure 1A:
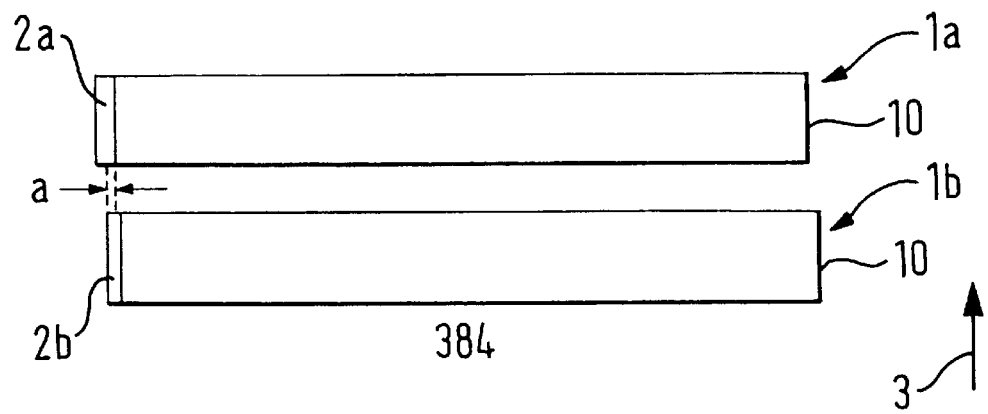
FIG. 1A illustrates the array of detector elements of an imaging system in accordance with the present invention.

Referring to FIG. 1A this illustrates a linear array 1 of detector elements suitable for use in an imager in accordance with the present invention. The long linear array 1 comprises two sections 1a and 1b, each having in this example 384 columns 2 of detector elements, each column comprising 10 detector elements 5. The two sections 1a and 1b are offset by distance 'a', half the horizontal (as shown) distance between the centre's of adjacent detector elements. This arrangement is used to increase resolution, by interlacing data from the two sections doubling the density of detector elements that can be incorporated in a horizontal line. However this has no relevance to the performance of the present invention and the array can be considered as a single section 1 comprising 768 columns 2 of detector elements 5.

Figure 1B:
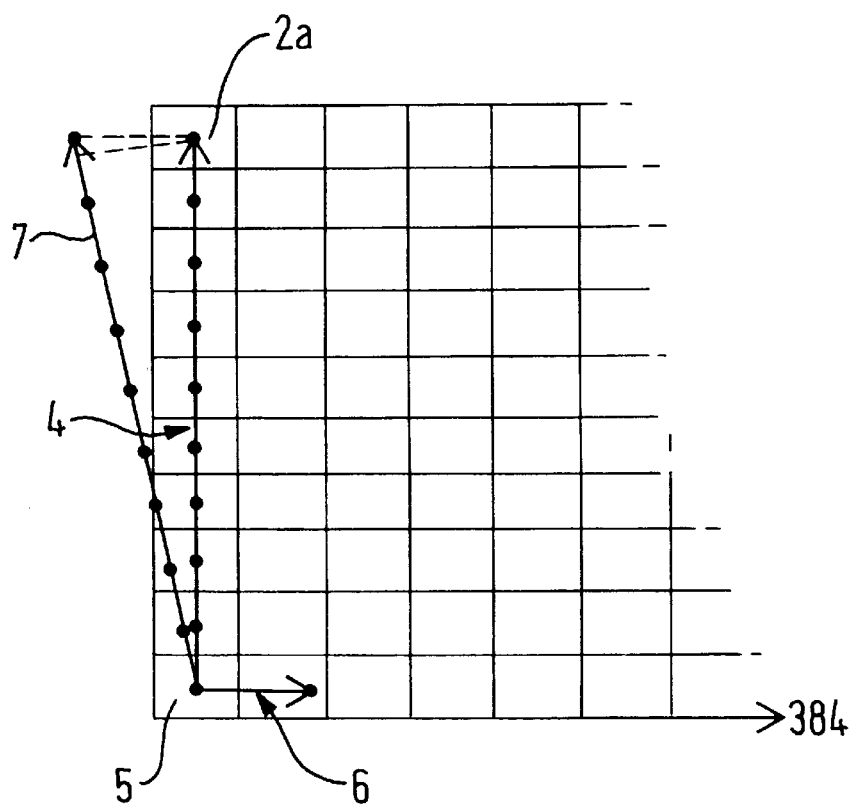
FIG. 1B schematically illustrates the principle operation of a time delay and integration channel of the array of detector elements illustrated in FIG. 1A.

When a stationary, or non-panned, image is viewed, the image is scanned across the 768 columns 2 in the direction of arrow 3. Each column 2 is a time delay and integration (TDI) channel, the first few columns of the array 1 being illustrated in FIG. 1B. Referring to FIG. 1B arrow 4 repre-sents how a spatial coordinate of an image is scanned vertically so that it passes across each detector element 5 of column 2a.

Charge generated by light received from this spatial coordinate is incident on each detector element and is clocked up the column in synchronism with the spatial coordinate being scanned such that the charge generated at each detector element is summed with that generated by preceding elements, the resultant charge read-out from the column 2a corresponding to the sum of the charge generated by the 10 detector elements 5 of the column 2a. To generate a frame comprising 576 lines, 576 plus 21 read-outs are performed, a typical read-out being 52µs.

The above describes a standard TDI technique which is normally applied to a short array of detector elements, corresponding to the short, (normally vertical) side of the image. The advantage of using a long linear array of detector elements and scanning vertically is that less read-outs are required to provide a standard format display however, as mentioned above, problem occurs when an image is panned in azimuth. When panned the image will drift sideways, as indicated by arrow 6 of FIG. 1B, while progressing up TDI channel 2a loosing picture resolution. The imager in accor-dance with the present invention compensates by scanning the image in dependance on the pan rate in direction of arrow 7 such that the sideways drift due to panning is compensated for and a point in an image again progresses vertically up the channel. The amplitude of the scan also has to be controlled to maintain a constant vertical velocity up the channel to maintain synchronisation with the read-out.

If the image generated were directly output onto a stan-dard display some geometric distortion would occur at high pan rates. However this can be corrected for by geometric correction techniques where correction values for different pan rates can be obtained from a look-up table. In many applications though, such as search and track, the imager will be an infra-red imager panned to survey a scene such as an area of sea in front of an aircraft. In such an application a "picture" is not always required when in the pan mode, for the pan rate may be such that it could not be analysed by eye. In such an application objects in the "image" are identified electronically and the system then switched from a search (pan) mode to a track (stationary) mode.

Figure 2:
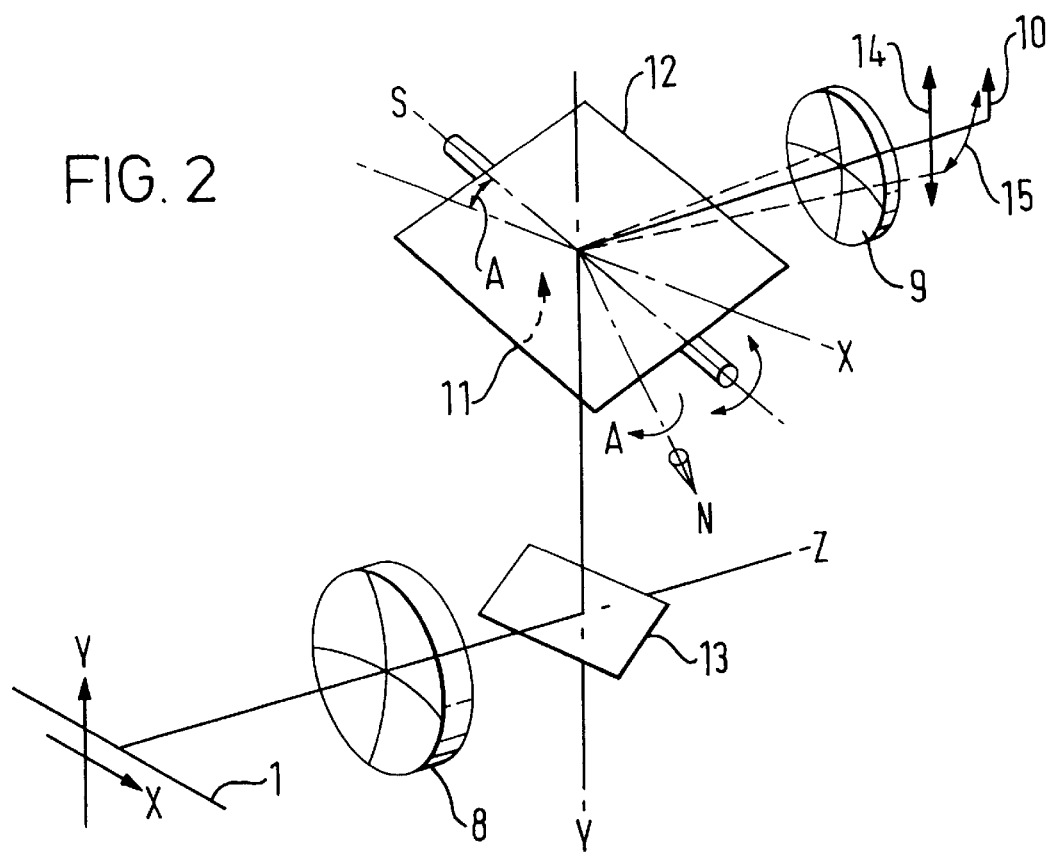
FIG. 2 schematically illustrates the optical principle employed by the present invention.

Referring now to FIG. 2 the components of an imaging system in accordance with the present invention comprise the linear array of detector elements 1 of FIG. 1, and optical arrangements 8 and 9 for focusing radiation from an image 10 on the linear array of detector elements 1 via reflection from the reflective surface 11 of scan optic 12 and mirror 13.

When the imaging system of FIG. 2 views a stationary scene the scan optic 12 is oscillated about frame scan axis "S" such as to perform a frame scan function scanning successive rows of an image across the linear array of detector elements 1 of FIG. 1, the array of detector elements corresponding to the long horizontal side of a display.

Frame scan axis "S" in this "non-pan" mode lies parallel to axis "X" the horizontal axis of the viewed image parallel to the rows of the array of detector elements 1. In this "non-pan" mode the imaging system scans the image 10 vertically, as represented by arrows 14.

When a scene being imaged is horizontally panned past the imaging system of FIGS. 1 and 2, either by the imaging system staring in a direction having an orthogonal component relative to direction of movement of the image past the imaging system, or by the imaging system being panned in azimuth, then if the scan axis "S" were to remain parallel to axis "X" the image would drift horizontally across the array of detector elements due to the scene being displaced during the time in which a complete image frame is composed as described above with reference to FIG. 1B. To compensate for this the scan axis "S" is rotated about vector scan axis "N", which axis "N" is normal to the plane of scan optic 12, when the scan optic 12 is in the centre of its field of view position. Rotating the scan axis by angle A about the vector scan axis "N" causes the image to be vector scanned across the array 1, as represented by arrows 15 causing data from a particular pointing angle of a stationary scene to be scanned on the linear array of detector elements in a direction indicated by arrow 7 of FIG. 1B.

Angle A of FIG. 2 is controlled in dependence of the angular velocity at which the scene is panned across the imaging system such that the image is vector scanned as represented by arrows 15 so that drift across the detector caused by panning is compensated for as shown with reference to FIG. 1B.

Values of Angle A are derived from a look-up table for any given pan velocity. A model of the scanning process and the distortion it provides can be run interactively to minimise the MTF loss across the field. The input variables to this are Angle A, scan amplitude and pan velocity.

Angle A will vary with any change in the rate at which an imaging system is panned across a scene, and will alternate between negative and positive values when the imaging system is scanned to and fro across a scene. The frame scan rate about axis 5 is controlled in dependence on Angle A, to ensure a constant vertical scan amplitude relative to the detector array, (and scan velocity), for a fixed frame period. The frame scan amplitude is calculated in the same way as Angle A.

Figure 3:
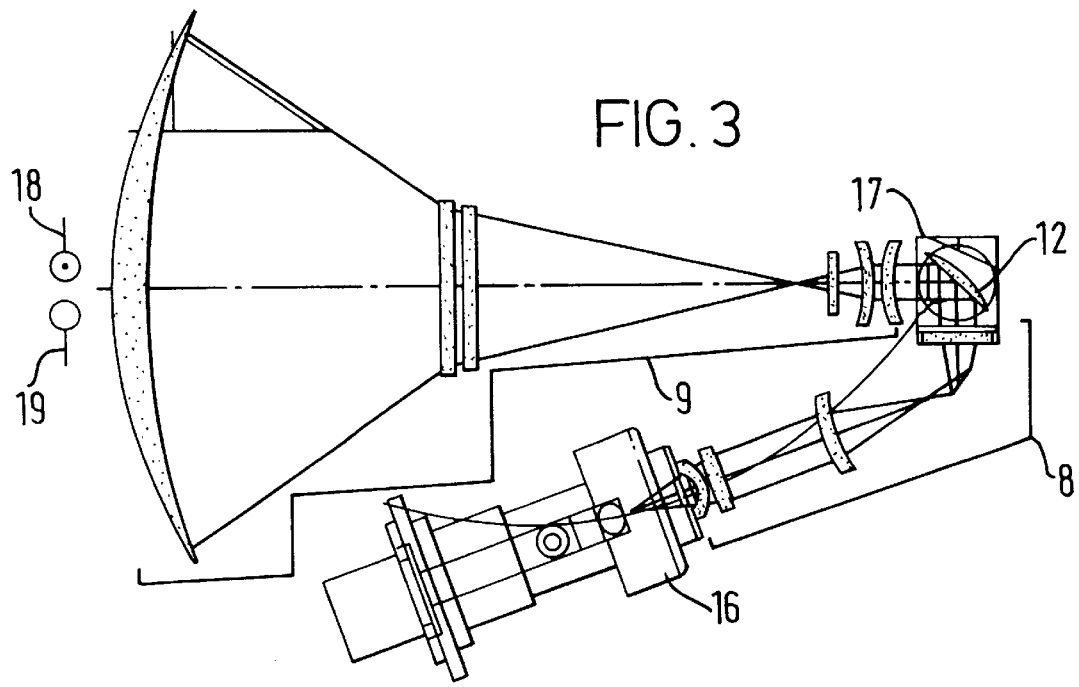
FIG. 3 is a schematic side elevation of apparatus in accordance with the present invention.

Referring to FIG. 3 there is illustrated apparatus employing the optical arrangement schematically illustrated in FIGS. 1 and 2. This comprises lens arrangements 8 and 9, detector housing 16, containing the linear array of cooled detector elements 1, scan optic 12 and associated control means 17. An infra-red image is viewed via objective lens arrangement 9 and is scanned across the detector array 1 by scan optic 12 mounted on scan optic control means 17, the scan optic 12 and associated control means 17 being shown in more detail in FIGS. 4A and 4B described below. The imaging system of FIG. 3 is arranged to be panned across a scene into or out of the plane of the paper as indicated by symbols 18 and 19.

Referring to FIG. 4A the scan optic 12 is mounted on the scan optic control apparatus 17 by shaft 20 driven by scan motor 21. The motor 21 is normally a torque motor with additional transducers identifying the position of the scan optic 12, enabling the position of the scan optic to be accurately controlled.

The scan optic control means 17 further comprises vector scan motor 22 which drives geared shaft 23, mechanically connected to support member 24 by the pin 25 and fork 26 mechanism shown in FIG. 4C. The fork 26 is threaded such that it is displaced along shaft 23 by rotation of the shaft 23. Slot 27 in the fork 26 engages with pin 25 extending from the bottom of the support member 24 such that rotation of the shaft 23 by motor 22 controls the angle of the scan optic control means 17 by rotating it on bearing 28 relative to the support member 24. Rotation of the control means about axis "N" rotates the scan axis "S" as described with reference to FIG. 2. The vector scan motor may be a stepper motor 22 or alternatively a DC motor with a transducer employed so that the precise position of the scan axis is known.

Figure 5:
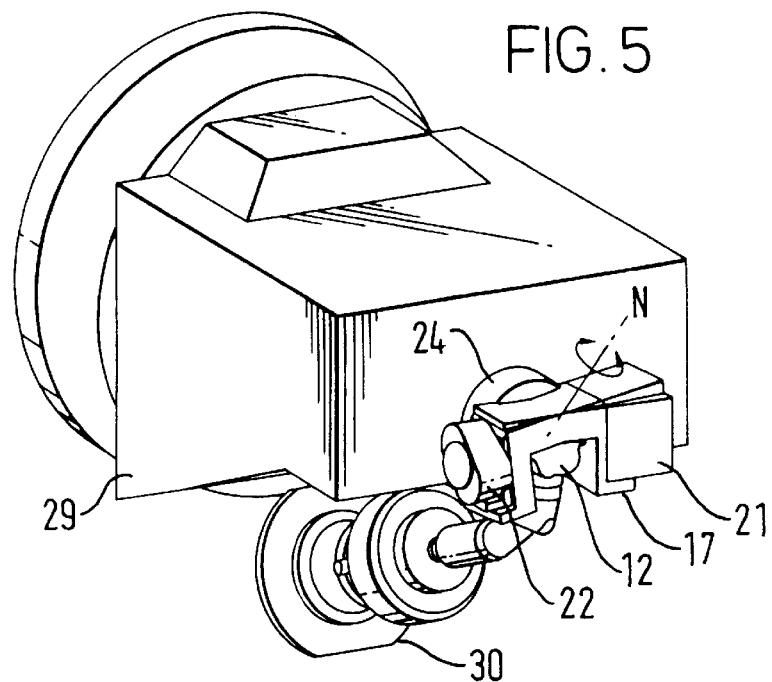
FIG. 5 illustrates an imaging system in accordance with the present invention.

An assembled imaging system in accordance with the present invention is shown in FIG. 5. Casing 29 houses the objective lens arrangement 9 of FIGS. 2 and 3, to which casing is mounted detector housing 30, incorporating optical arrangement 8 and the linear array of detector elements 1. The output of the objective lens arrangement 8 is reflected to the array of the detector elements via scan optic 12 mounted to the scan optic control means 17 which functions as previously described.

Figure 6:
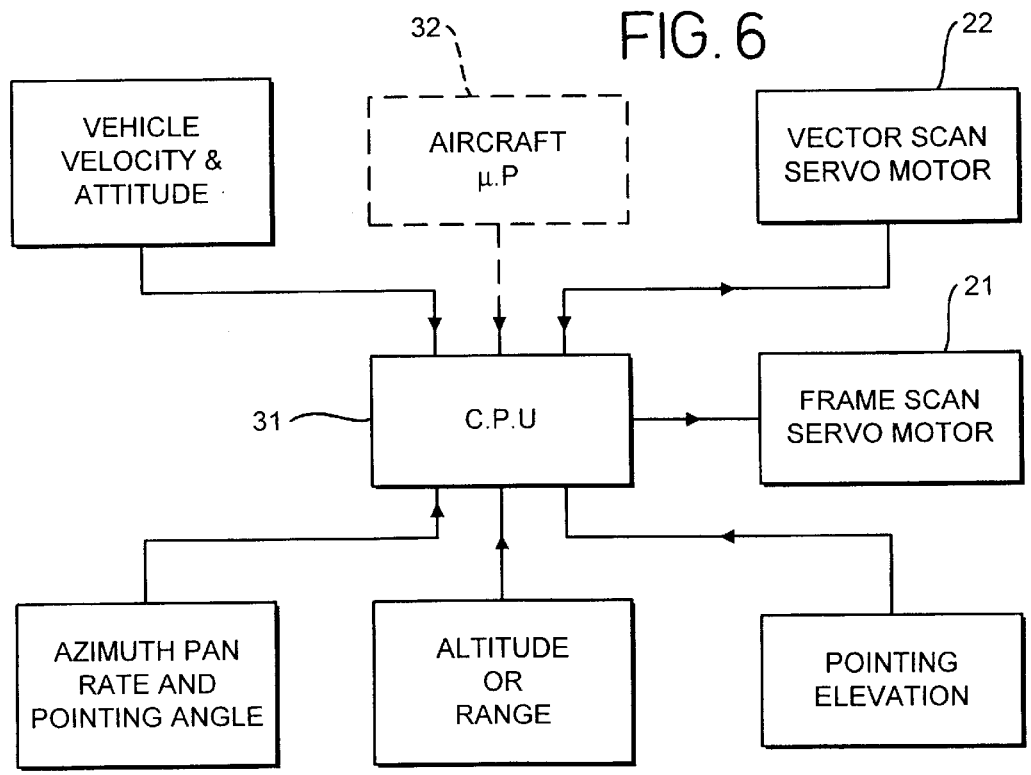
FIG. 6 schematically illustrates the inputs to an imaging system in accordance with the present invention when mounted onboard an aircraft.

FIG. 6 schematically illustrates the various inputs that a central processing, unit 22 of the imaging system receives when the imaging system is located on board an aircraft to scan in front of the aircraft. Angular scan velocity is calculated from the standard navigation system data available, and the search and track system itself, to be able to equate position on the image to a ground coordinate (such an arrangement may typically be employed in search applications where the received images are electronically processed to identify a target and/or stored on video for subsequent processing). The central processor receives the velocity of the vehicle and attitude, the altitude or range of vehicle from the scanned scene, the pointing elevation of the imaging system and the azimuth pan rate and pointing angle of the imaging system. This may be received from an aircraft microprocessor 32. From this the angular pan velocity can be calculated. Knowing the pan velocity the necessary signals are computed and sent to the vector scan motor 22 and frame scan motor 21.

One specific embodiment of the invention has been described above with reference to a system arranged to be panned in azimuth, (where the image is scanned vertically across a horizontal linear array of detector elements). However it will be appreciated that the invention is equally applicable to an imaging system panned vertically where the image is scanned horizontally across a vertical array of detector elements. Furthermore it will be appreciated that in any imaging system an image can be rotated within that system. In this regard references to horizontal and vertical used in the above specification are to be construed as relating to the optical image, even though that image may have been rotated within the imaging system.

Many alternative arrangements within the scope of the appended claims will occur to one skilled in the art of optical systems, the embodiment described above and illustrated in the drawings being given by way of example only.

What I claim is:

1. An imaging system arranged to be optically panned across a scene, the system comprising:

an array of detector elements consisting of a row, extending in a first direction, of channels, each channel comprising a number of detector elements extending in a second direction perpendicular to the first direction; a scan optic arranged to scan an image of the viewed scene across the array of detector elements; and scan optic control means arranged to vary the direction of the scan performed by the scan optic in dependance on the velocity at which the imaging system is panned across a scene such that a point of the image is scanned on the array in nominally the same direction irrespective of pan velocity, which direction substantially corresponds to the second direction.

2. A system as claimed in claim 1 wherein each channel is a time delay and integration (TDI) channel comprising a plurality of detector elements.

3. A system as claimed in claim 1 wherein the scan optic scans an image across the detector array nominally in the second direction by rotation about a scan axis, and wherein the scan optic control means comprises means arranged to rotate in dependance on the pan velocity the scan axis of the scan optic about a vector scan axis, normal to the plane of an optical surface of the scan optic when the scan optic is substantially in a centre of field of view position, such that movement of the image due to pan rate is substantially compensated for by rotation of the scan axis about the vector scan axis.

4. A system as claimed in claim 1 wherein the scan optic is mounted on piezoelectric elements which elements are controlled by the scan optic control means to vary the scan performed by the scan optic in dependence on the velocity at which the imaging system is panned across a scene.

5. A system is claimed in claim 1 wherein the scan velocity in the second direction is maintained substantially constant irrespective of pan velocity.

6. A system as claimed in claim 1 further comprising an objective lens assembly in fixed positional relationship to the array of detector elements.

7. A system as claimed in claim 1 for mounting on an aircraft, the system further comprising means for determining the rate at which the image is panned across the field of view of the imaging system from data relating to the velocity and altitude of the aircraft, the azimuth pan rate of the imaging system and the range and/or altitude and pointing elevation of the boresight of the imaging system.

8. A system as claimed in claim 1 arranged to be panned in azimuth wherein the image is scanned substantially vertically by the scan optic over a horizontal linear array of detector elements.

9. A system as claimed in claim 1 for imaging infra-red radiation.

10. A system as claimed in claim 9 wherein the detector is cooled.

11. A system as claimed in claim 1 wherein the array of detector elements is a long linear array, each column of which corresponds to a column on a display.

12. A system as claimed in claim 3 wherein each channel is a time delay and integration (TDI) channel comprising a plurality of detector elements.

13. A system as claimed in claim 12 wherein the scan optic control means is arranged to maintain scan velocity in the second direction substantially constant irrespective of pan velocity.

14. A system as claimed in claim 13 for mounting on an aircraft, the system further comprising means for determining the rate at which the image is panned across the field of view of the imaging system from data relating to the velocity and altitude of the aircraft, the azimuth pan rate of the imaging system and the range and/or altitude and pointing elevation of the boresight of the imaging system.

15. A system as claimed in claim 14 for imaging infra-red radiation.

* * * * *